(12) United States Patent
Zhao

(10) Patent No.: US 12,707,350 B2
(45) Date of Patent: Aug. 11, 2026

(54) HANDOVER METHOD, TERMINAL, NETWORK DEVICE, AND RELAY

(71) Applicant: DATANG MOBILE COMMUNICATIONS EQUIPMENT CO., LTD., Beijing (CN)

(72) Inventor: Yali Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 346 days.

(21) Appl. No.: 18/248,488

(22) PCT Filed: Oct. 9, 2021

(86) PCT No.: PCT/CN2021/122807

§ 371 (c)(1),
(2) Date: Apr. 10, 2023

(87) PCT Pub. No.: WO2022/073501

PCT Pub. Date: Apr. 14, 2022

(65) Prior Publication Data

US 2023/0397075 A1 Dec. 7, 2023

(30) Foreign Application Priority Data

Oct. 10, 2020 (CN) ......................... 202011078367.7

(51) Int. Cl.
*H04W 36/00* (2009.01)
*H04W 36/30* (2009.01)

(52) U.S. Cl.
CPC .... *H04W 36/00835* (2018.08); *H04W 36/304* (2023.05)

(58) Field of Classification Search
CPC ......... H04W 36/00835; H04W 36/304; H04W 36/08; H04W 36/18; H04W 36/03; H04W 36/083; H04W 36/0055
See application file for complete search history.

(56) References Cited

U.S. PATENT DOCUMENTS

2018/0070400 A1* 3/2018 Wu ......................... H04W 4/06
2018/0139682 A1 5/2018 Xu et al.
(Continued)

FOREIGN PATENT DOCUMENTS

CN 106686674 A 5/2017
CN 107771410 A 3/2018
(Continued)

OTHER PUBLICATIONS

International Search Report for PCT Application No. PCT/CN2021/122807 issued on Jan. 6, 2022 and its English Translation provided by WIPO.

(Continued)

*Primary Examiner* — Barry W Taylor
(74) *Attorney, Agent, or Firm* — Ladas & Parry, LLP

(57) ABSTRACT

A handover method, a terminal, a network device, and a relay are provided. The handover method includes obtaining first indication information from a candidate relay, transmitting the first indication information to a source network device to which a source cell belongs; wherein, the first indication information is configured to assist the source network device in determining a first target cell and/or a first target relay for handover of the terminal.

19 Claims, 7 Drawing Sheets

(56) References Cited

U.S. PATENT DOCUMENTS

| | | | | |
|---|---|---|---|---|
| 2018/0152986 | A1 | 5/2018 | Jung et al. | |
| 2018/0343598 | A1 | 11/2018 | Xu et al. | |
| 2019/0200288 | A1* | 6/2019 | Folke | H04W 48/20 |
| 2019/0327661 | A1 | 10/2019 | Li et al. | |
| 2020/0221532 | A1 | 7/2020 | Jung et al. | |
| 2020/0383031 | A1 | 12/2020 | Gu et al. | |
| 2022/0060967 | A1* | 2/2022 | Xu | H04W 40/22 |
| 2023/0067429 | A1* | 3/2023 | Liu | H04W 36/08 |
| 2023/0145738 | A1* | 5/2023 | Yang | H04W 40/246 370/315 |
| 2023/0156564 | A1* | 5/2023 | Wang | H04W 76/20 370/329 |
| 2023/0189100 | A1* | 6/2023 | Xu | H04W 36/033 |
| 2024/0373321 | A1* | 11/2024 | Chen | H04W 40/22 |
| 2025/0227508 | A1* | 7/2025 | Pan | H04W 24/02 |

FOREIGN PATENT DOCUMENTS

| | | | |
|---|---|---|---|
| CN | 109905887 | A | 6/2019 |
| CN | 110611901 | A | 12/2019 |
| EP | 3273745 | A1 | 1/2018 |
| EP | 3457761 | A1 | 3/2019 |
| WO | 2016185285 | A1 | 11/2016 |
| WO | 2018059126 | A1 | 4/2018 |

OTHER PUBLICATIONS

Written Opinion for PCT Application No. PCT/CN2021/122807 issued on Jan. 6, 2022 and its English Translation provided by WIPO.

International Preliminary Report on Patentability for PCT Application No. PCT/CN2021/122807 issued on Mar. 28, 2023 and its English Translation provided by WIPO.

"D2D system design enhancement to support out-of-coverage and partial coverage discovery for UE-network relays," R1-151328, D2D, Belgrade, Serbia, Apr. 20-24, 2015, all pages.

"L2/L3 UE-to-NW Relay Comparison" 3GPP TSG-RAN WG2 Meeting #111-e, R2-2006611, Electronic, Aug. 17-28, 2020 , Agenda Item: 8.7.3, Source: CATT, all pages.

"Service continuity for L2 UE-to-Network relay," 3GPP TSG-RAN WG2 Meeting #111 electronic, R2-2008048, Aug. 17-28, 2020 , Agenda Item: 8.7.3, Source: Huawei, HiSilicon, all pages.

First Chinese Office Action and search report for the corresponding Chinese Patent Application No. 202011078367.7 issued on Dec. 8, 2022 and its English translation provided by foreign associate.

International Search Report for PCT Application No. PCT/CN2021/122807 issued by the international patent Office on Jan. 6, 2022 and its English Translation provided by WIPO.

Written Opinion for PCT Application No. PCT/CN2021/122807 issued by the international patent Office on Jan. 6, 2022 and its English Translation provided by WIPO.

International Preliminary Report on Patentability for PCT Application No. PCT/CN2021/122807 issued by the international patent Office on Mar. 28, 2023 and its English Translation provided by WIPO.

"D2D system design enhancement to support out-of-coverage and partial coverage discovery for UE-network relays" R1-151328-D2D, Belgrade, Serbia, Apr. 20-24, 2015.

"L2/L3 UE-to-NW Relay Comparison" 3GPP TSG-RAN WG2 Meeting #111-e, R2-2006611, Electronic, Aug. 17-28, 2020 , Agenda Item: 8.7.3, Source: CATT.

"Service continuity for L2 UE-to-Network relay" 3GPP TSG-RAN WG2 Meeting #111 electronic, R2-2008048 Aug. 17-28, 2020 , Agenda Item: 8.7.3, Source: Huawei, HiSilicon.

First Chinese Office Action for Chinese Patent Application No. 202011078367.7 issued on Dec. 8, 2022 and its English translation provided by foriegn associate.

Extended European Search Report for the corresponding European Patent Application No. 21877018.8 issued by the European Patent Office on Mar. 4, 2024.

* cited by examiner

HANDOVER METHOD, TERMINAL, NETWORK DEVICE, AND RELAY

CROSS-REFERENCE TO RELATED APPLICATIONS

This application is a U.S. national phase application of a PCT Application No. PCT/CN2021/122807 filed on Oct. 9, 2021, which claims a priority to Chinese Patent Application No. 202011078367.7 filed on Oct. 10, 2020, the disclosures of which are incorporated in their entireties by reference herein.

TECHNICAL FIELD

The present disclosure relates to the field of communication technology, and in particular, relates to a handover method, a terminal, a network device, and a relay.

BACKGROUND

In the related art, a relay (Relay) is introduced in order to extend network coverage. The relay itself may be a terminal or a network device. For a case where the relay is the terminal, two types of relays are supported: a terminal-to-network relay (UE-to-Network Relay) and a terminal-to-terminal relay (UE-to-UE Relay). For UE-to-Network Relay, an interface between the relay and the network device uses a Uu interface, an interface between the relay and a relayed UE uses a sidelink interface; a link between the relay and the network is called a backhaul link (Backhaul link, BH). For the UE-to-UE relay, a sidelink interface is used between the relayed UE and the relay, and the two relayed UEs can transmit data through the relay. Connection of accessing the network by the UE through the relay is also referred to as an indirect connection, and connection of accessing the network by the UE through the Uu interface is also referred to as a direct connection. The relayed UE may also be referred to as a remote UE (Remote UE).

After introduction of the relay, for a handover from a direct connection to an indirect connection or a handover from an indirect connection to an indirect connection, since the terminal needs to be connected to the network through the relay, i.e., a target communication link is divided into two parts: the sidelink interface and the Uu interface, a flow of handover based on a measurement result of the Uu interface in the related art is not feasible.

SUMMARY

The present disclosure provides a handover method, a terminal, a relay device, and a network device, for solving a handover problem between a direct connection and an indirect connection or between an indirect connection and an indirect connection.

A handover method performed by a terminal is provided in the embodiments of the present disclosure. The method includes: obtaining first indication information from a candidate relay; transmitting the first indication information to a source network device to which a source cell belongs, wherein, the first indication information is configured to assist the source network device in determining a first target cell and/or a first target relay to which the terminal hands over.

A handover method performed by a network device is provided in the embodiments of the present disclosure, the network device being a source network device to which a source cell belongs. The method includes: receiving first indication information transmitted by a terminal; performing a handover decision according to the first indication information, and determining a first target cell and/or a first target relay to which the terminal is to hand over.

A terminal is provided in the embodiments of the present disclosure. The terminal includes a transceiver, a memory, a processor and a computer program stored on the memory and executable on the processor, wherein when the processor executes the computer program, the processor implements the following steps: obtaining first indication information from a candidate relay; transmitting the first indication information to a source network device to which a source cell belongs, wherein, the first indication information is configured to assist the source network device in determining a first target cell and/or a first target relay to which the terminal hands over.

A network device is provided in the embodiments of the present disclosure, the network device being a source network device to which a source cell belongs. The network device includes a transceiver, a memory, a processor and a computer program stored on the memory and executable on the processor, wherein, when the processor executes the computer program, the processor implements the following steps: receiving first indication information transmitted by a terminal; performing a handover decision according to the first indication information, and determining a first target cell and/or a first target relay to which the terminal is to hand over.

A relay is provided in the embodiments of the present disclosure, the relay being a candidate relay for handover of a terminal. The relay includes a transceiver, a memory, a processor and a computer program stored on the memory and executable on the processor, wherein, when the processor executes the computer program, the processor implements the following steps: transmitting first indication information to a terminal, wherein the first indication information is configured to assist a source network device in determining a first target cell and/or a first target relay to which the terminal hands over.

DETAILED DESCRIPTION

Figure 1:
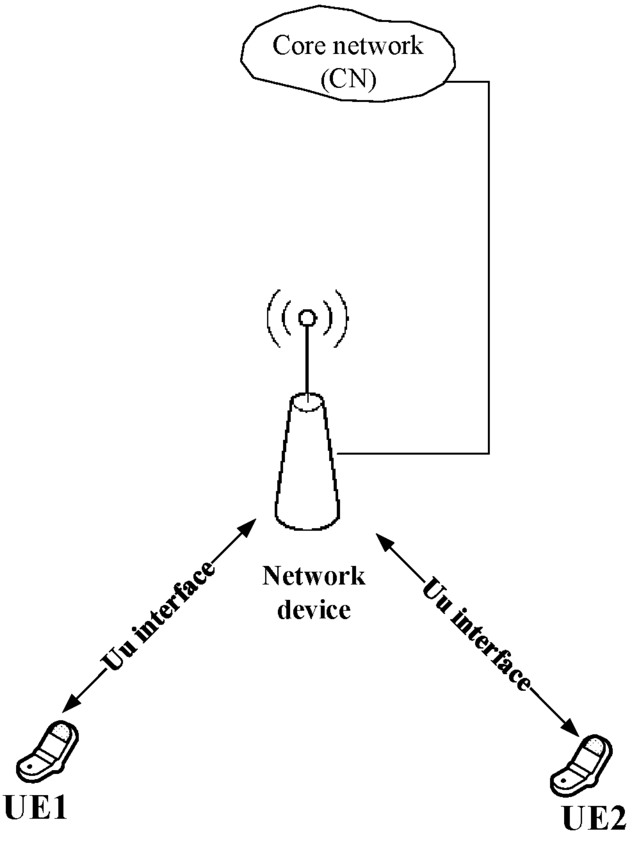
FIG. 1 is a schematic diagram showing a communication mode controlled centrally by a network.

In order to make technical problems, technical solutions and advantages to be solved by the present disclosure more clear, detailed description will be given hereinafter with reference to the drawings and specific embodiments. In the following description, specific details such as specific configurations and components are provided merely to assist in a thorough understanding of embodiments of the present disclosure. Accordingly, it should be apparent to those skilled in the art that various changes and modifications may be made to the embodiments described herein without departing from the scope and the spirit of the present disclosure. In addition, description of known functions and configuration are omitted for clarity and brevity.

It should be understood that references to "one embodiment" or "an embodiment" throughout the specification mean that particular features, structures, or characteristics related to embodiments are included in at least one embodiment of the present disclosure. Thus, "in one embodiment" or "in an embodiment" appearing throughout the specification need not necessarily refer to the same embodiment. Furthermore, these particular features, structures, or characteristics may be combined in any suitable manner in one or more embodiments.

In the various embodiments of the present disclosure, it should be understood that sizes of sequence numbers of processes described below do not imply a sequential order of execution, the order of execution of the processes should be determined by their function and inherent logic, and should not constitute any limitation on a implementation process of the embodiments of the present disclosure.

In addition, such terms as "system" and "network" herein are often used interchangeably herein.

In the embodiments provided herein, it is understood that "B corresponding to A" indicates that B is associated with A from which B may be determined. However, it should also be understood that determining B from A does not mean determining B from A alone, but B may also be determined from A and/or other information.

In the embodiments of the present disclosure, forms of access networks are not limited, and may be access networks of a macro base station (Macro Base Station), a pico base station (Pico Base Station), a Node B (a name of a 3G mobile base station), an enhanced base station (eNB), a home enhanced base station (Femto eNB or Home eNode B or Home eNB or HeNB), a relay station, an access point, an RRU (Remote Radio Unit), an RRH (Remote Radio Head, a RF remote head), etc. The user terminal may be a mobile telephone (or a handset), or other devices capable of transmitting or receiving radio signals, including a user equipment, a personal digital assistant (PDA), a wireless modem, a wireless communication device, a handheld device, a laptop computer, a cordless telephone, a wireless local loop (WLL) station, a CPE (Customer Premise Equipment) capable of converting a mobile signal into a WiFi signal, a mobile smart hotspot, a smart home appliance, or other devices capable of spontaneously communicating with a mobile communication network without human operation, etc.

In describing the embodiments of the present disclosure, some concepts used in the following description are first explained.

(1) Cellular Network Communication

A conventional wireless communication adopts a cellular network communication, that is, the terminal and the network device transmit uplink and downlink data/control information through the Uu interface, as shown in FIG. 1.

(2) Sidelink

Figure 2:
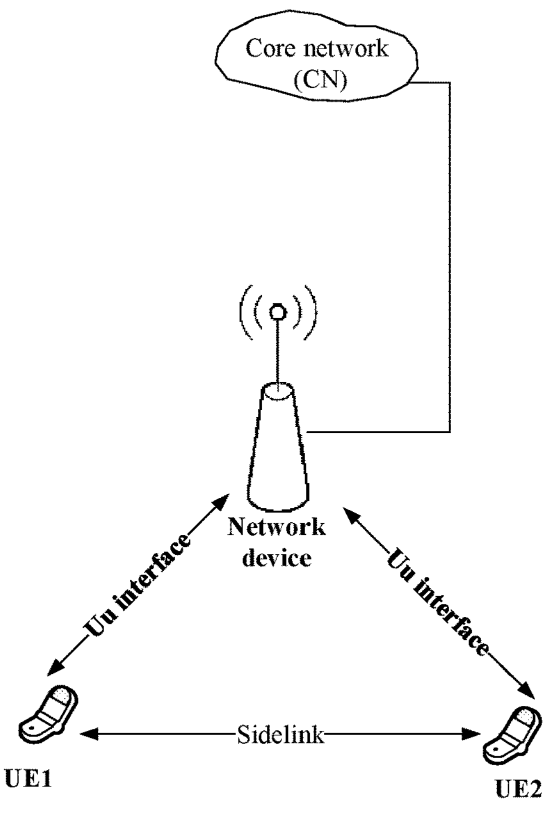
FIG. 2 illustrates a schematic diagram of a sidelink interface discovery/communication.

Sidelink refers to a manner in which adjacent terminals can transmit data through a sidelink link (Sidelink, SL) within a short range. A wireless interface corresponding to the Sidelink is called a sidelink interface (also called a Sidelink interface or a PC5 interface), as shown in FIG. 2.

(3) Relay

Figure 3:
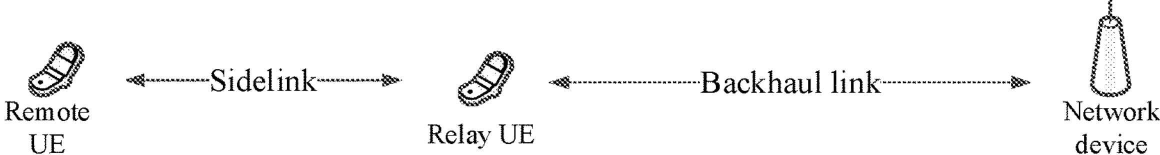
FIG. 3 is a schematic diagram of a UE-to-Network Relay.

A relay (Relay) may be a network device or a terminal with a relay function. If the Relay is a terminal, two types of relay operation modes are supported:

for the UE-to-Network relay, the interface between the relay and the network uses the Uu interface, and the interface between the relayed UE (remote UE) and the relay uses the sidelink interface; the link between the relay and the network may be referred to as a backhaul link for the remote UE;

for the UE-to-UE relay, the sidelink interface is used between the relay and the relayed UE; the two relayed UEs may perform data transmission through the relayed UE. The schematic diagram of UE-to-Network Relay is shown in FIG. 3.

Bearers in a relay scenario are classified into three categories:

a sidelink interface bearer which is a bearer between the remote UE and the relayed UE;

an end-to-end bearer between the remote UE and the network device, i.e., an end-to-end bearer established between the remote UE and the network device;

a bearer of the remote UE on the Uu interface of the backhaul link, i.e., the bearer between the relayed UE and the network device for carrying the data of the remote UE.

No matter which type of bearer, the bearer and the logical channel have a one-to-one correspondence, the logical channel has a corresponding logical channel identifier.

Figure 4:
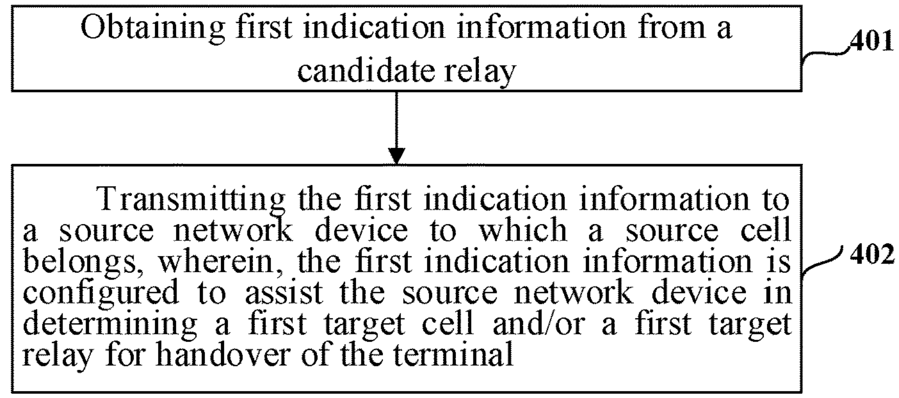
FIG. 4 is a first flowchart of an embodiment of the present disclosure.

In particular, embodiments of the present disclosure provide a handover method performed by a terminal, so as to solve a handover problem between a direct connection and an indirect connection or between an indirect connection and an indirect connection. As shown in FIG. 4, the handover method includes steps 401-402.

Step 401: obtaining first indication information from a candidate relay.

The candidate relay is a candidate relay when the terminal needs to switch from a current network connection mode to an indirect connection, and the current network connection mode of the terminal may be a direct (direct) connection, or may be an indirect connection, and when the current network connection mode is switched to an indirect connection, the terminal needs to establish a connection with the network through the candidate relay.

The number of the candidate relays may be one or more, and when the number of the candidate relays is one, the candidate relay correspond to one serving cell, and when number of the candidate relays are plural, different candidate relays may correspond to different serving cells or the same serving cell. The first indication information is obtained by the terminal from the candidate relay.

Step 402: transmitting the first indication information to a source network device to which a source cell belongs, wherein, the first indication information is configured to assist the source network device in determining a first target cell and/or a first target relay for handover of the terminal.

The terminal obtains the first indication information, and transmits the first indication information to the source network device, so that the source network device performs a handover decision according to the first indication information. The source network device is a network device to which a source cell currently connected to the terminal belongs, and the first indication information may include information about candidate cells and/or candidate relays of the terminal, and is configured to assist the source network device in determining the first target cell and/or the first target relay for the handover of the terminal.

In the embodiment of the present disclosure, a terminal obtains first indication information from a candidate relay, and reports the first indication information to a source network device to which a source cell belongs. The first indication information may assist the source network device to determine a first target cell and/or a first target relay for handover of the terminal, so that the source network device performs the handover decision. The present application provides a method for a terminal to perform handover, which can ensure the service continuity when the terminal performs handover from the direct connection to the indirect connection or performs handover from the indirect connection to the indirect connection.

It should be noted that, since the network supports multi-handover preparation, the number of first target cells and/or first target relays determined by the source network device for the handover of the terminal may be one or more.

Specifically, the first indication information may include at least one of following:

- Public Land Mobile Network (PLMN) identification information corresponding to the candidate cell to which the candidate relay belongs;
- cell identification information corresponding to the candidate cell to which the candidate relay belongs;
- access mode indication information of accessing the candidate cell by the terminal;
- association relation indication information between the candidate relay and the candidate cell;
- association relation indication information between a candidate relay link and the candidate cell;
- a channel quality measurement result of the Uu interface of the candidate relay;
- a channel quality measurement result of a sidelink interface between a candidate relay and the terminal;
- identification information of the candidate relay;
- identification information of the candidate relay link;
- moving speed indication information of the candidate relay;
- electricity quantity indication information of the candidate relay;
- indication information of a service that the candidate relay may serve, for example, group information, quality of service (Quality of Service, QoS) of the service, or a service type.

The first indication information includes, but is not limited to, one or a combination of the above, and according to the content of the first indication information, the source network device can uniquely determine the second target relay or the second target cell to which the terminal is to hand over. The second target relay or the second target cell is subordinate to the first target relay or the first target cell, i.e. the second target cell is a subset of the first target cell. If there exists only one first target cell, the first target cell and the second target cell are the same cell; the second target relay is a subset of the first target relay, and if there exists only one first target relay, the second target relay and the first target relay are the same relay.

The number of candidate relays may be N, and N is an integer greater than or equal to 1. The number of the candidate relays may be one or more, and when N is greater than or equal to 2, candidate cells corresponding to at least two candidate relays are the same or different.

Further, obtaining the first indication information from the candidate relay includes at least one of following:

- obtaining the first indication information through a relay discovery related message broadcast by the candidate relay on a sidelink interface, wherein the relay discovery related message varies with a sidelink interface discovery mode, such as a relay discovery announcement message;
- obtaining the first indication information through a sidelink interface Radio Resource Control (PC5-RRC) message, wherein the terminal establishes a sidelink interface unicast connection with the candidate relay.

In this embodiment, when the terminal obtains the first indication information from the candidate relay, implementation of the terminal includes but is not limited to one of the following methods, wherein,

- method 1: the candidate relay broadcasts a relay discovery related message on a sidelink interface, such as a PC5 interface, and the first indication information may be carried by the relay discovery related message; the terminal obtains the first indication information by obtaining the relay discovery related message broadcast by the candidate relay;
- method 2: after the terminal performs relay selection, a sidelink interface unicast connection is establish between the terminal and the candidate relay, and then the candidate relay notifies the terminal of the first indication information through the PC5-RRC;
- method 3: a part of information content in the first indication information is obtained using the method 1, and a remaining part of the first indication information is obtained using the method 2.

Optionally, the method further includes: transmitting second indication information to a source network device to which the source cell belongs; the second indication information includes at least one of following:

- a channel quality measurement result of a sidelink interface between the terminal and the source relay;
- moving speed indication information of the source relay;
- electricity quantity indication information of the source relay.

If this embodiment is applied to an indirect-to-indirect handover between the terminal and the network, the terminal may also report the second indication information when reporting the first indication information to the source network device. The second indication information may be carried by the first indication information, or may be transmitted separately by the terminal. The source relay refers to the current service relay of the terminal, and the second indication information includes information related to the current service relay of the terminal.

Optionally, the method further includes: obtaining an RRC reconfiguration message; determining a second target cell and/or a second target relay according to the RRC reconfiguration message, and transmitting an RRC reconfiguration complete message to a network device to which the second target cell belongs, or transmitting, through the second target relay, an RRC reconfiguration complete message to a network device to which the second target cell belongs.

The RRC reconfiguration message is transmitted by a source network device, and the terminal can determine, according to the RRC reconfiguration message, a second target cell and/or a second target relay to which the terminal is to hand over. After the terminal determines the second target cell and/or the second target relay, if the second target cell corresponds to a direct connection, the terminal may directly transmit an RRC reconfiguration complete message to a network device to which the second target cell belongs. If the second target cell corresponds to an indirect connection, an RRC reconfiguration complete message may be sent, via the second target relay, to the network device to which the second target cell belongs. The RRC reconfiguration message may include at least one of the following: in addition to existing configuration:

identification information of the second target relay;

identification information of the second target relay link;

mapping relationship between a sidelink interface radio link control (RLC) channel between the terminal and the second target relay and a second target relay Uu interface RLC channel.

Optionally, transmitting the first indication information to the source network device to which the source cell belongs includes: transmitting, through a Uu interface, the first indication information to the source network device to which the source cell belongs, or transmitting, through the source relay, the first indication information to the source network device to which the source cell belongs.

When the connection between the terminal and the network is switched from a direct connection to an indirect direction, the terminal may report the first indication information to the source network device to which the source cell belongs through the Uu interface, and when the connection between the terminal and the network is switched from an indirect connection to an indirect connection, the terminal may report the first indication information to the source network device to which the source cell belongs through the source relay currently in service.

After the source network device receives the first indication information, the source network device performs a handover decision according to the content of the first indication information, and determines a first target cell and/or a first target relay to which the terminal is to hand over; and then transmits a handover request message to the network device to which the first target cell belongs through an inter-base station interface, and the network device to which the first target cell belongs transmits a handover request acknowledge message to the source network device. The number of the first target cell and/or the first target relay may be one or more. The handover request message and the handover request acknowledge message may include, but are not limited to, one or a combination of the following indication information: identification information of the terminal performing handover; identification information of the first target relay or the first target relay link, in the first target cell, to be accessed by the terminal.

The implementation process of the handover method of the present application is described below through specific embodiments.

Example 1: a handover procedure from a direct connection to an indirect connection between the terminal and the network.

Figure 5:
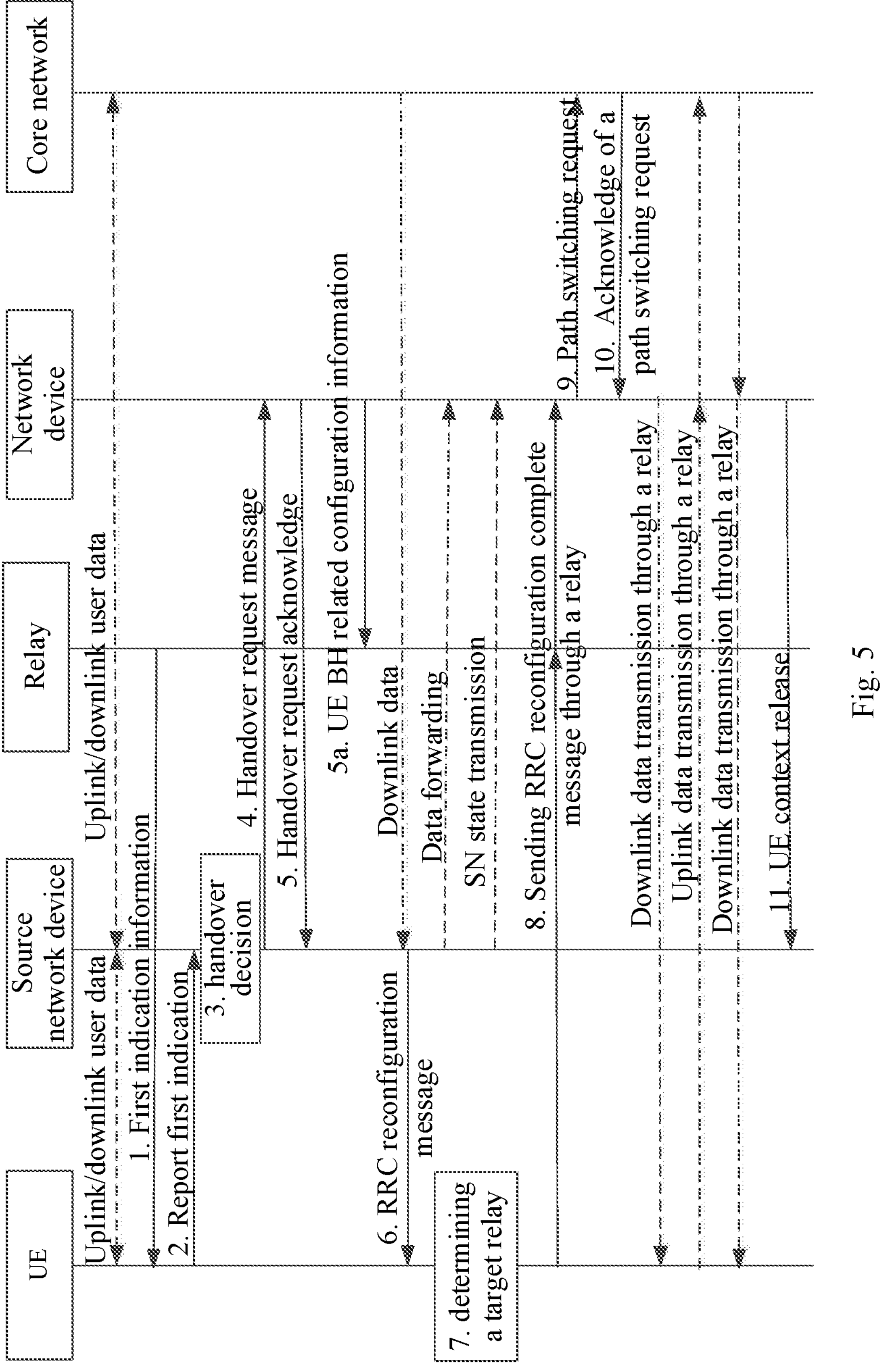
FIG. 5 is a second flowchart of an embodiment of the present disclosure.

As shown in FIG. 5, an uplink/downlink user data interaction is performed between a terminal (User Equipment, UE) and a source network device to which a source cell belongs, and between the source network device and a core network.

Step 1: the UE obtains the first indication information from a candidate relay (relay). the method for the UE to obtain the first indication information from the relay may include, but is not limited to, one of the following:

method 1: obtaining the first indication information through a relay discovery related message broadcast by a candidate relay through a sidelink interface;

method 2: obtaining the first indication information through a sidelink interface radio resource control PC5-RRC message, wherein the terminal establishes a sidelink interface unicast connection with the candidate relay.

method 3: combining the method 1 and the method 2; part of the information is provided using the method 1, and the remaining of the information is provided using the method 2.

The first indication information includes, but is not limited to, at least one of following:

Public Land Mobile Network (PLMN) identification information corresponding to the candidate cell to which the candidate relay belongs;

cell identification information corresponding to the candidate cell to which the candidate relay belongs;

access mode indication information of accessing the candidate cell by the terminal;

association relation indication information between the candidate relay and the candidate cell;

association relation indication information between a candidate relay link and the candidate cell;

a channel quality measurement result of the Uu interface of the candidate relay;

a channel quality measurement result of a sidelink interface between a candidate relay and the terminal;

identification information of the candidate relay;

identification information of the candidate relay link;

moving speed indication information of the candidate relay;

electricity quantity indication information of the candidate relay;

indication information of a service that the candidate relay may serve.

The number of the candidate relays may be one or more, and when there are multiple candidate relays, the serving cells corresponding to different candidate relays may be the same or different.

Step 2: the UE reports the first indication information to the source network device to which the source cell belongs through the Uu interface. The UE obtains the first indication information from the relay, and reports the first indication information to the source network device.

Step 3: handover decision is performed; after the source network device of the UE obtains the first indication information from the UE, the source network device performs the handover decision, and determines a first target cell and/or a first target relay.

Step 4: a handover request message; the handover request message transmitted by the source network device to the network device to which the first target cell belongs through the inter-base station interface may include, but is not limited to, one or a combination of the following indication information: identification information of the UE that will perform the handover; relay identification information or the identification information of a relay link used by the UE to access the network device to which the first target cell belongs.

Step 5: a handover request acknowledge; the handover request acknowledge message transmitted by the network device to which the first target cell belongs through the inter-base station interface to the source network device may include, but is not limited to, one or a combination of the following indication information: identification information of the UE that is to perform handover; relay identification information or the identification information of a relay link used by the UE to access the network device to which the first target cell belongs.

Optionally, the network device to which the first target cell belongs may further perform step 5a, that is, the network device to which the first target cell belongs notifies the relay of the mapping relationship between the sidelink interface RLC channel and the Uu BH channel of the UE.

The source network device determines a unique second target cell and/or a unique second target relay for the terminal according to the received handover request acknowledge message.

Step 6: the source network device transmits an RRC reconfiguration message to the UE through the Uu interface; in addition to the existing configuration, the RRC reconfiguration message may also carry the following:

identification information of the second target relay;

identification information of the second target relay link;

mapping relationship between a sidelink interface radio link control (RLC) channel between the terminal and the second target relay and a second target relay Uu interface RLC channel.

Step 7: the UE determines a second target relay to be accessed.

Step 8: the UE transmits an RRC reconfiguration complete message to the network device to which the second target cell belongs via the second target relay.

Step 9: the network device to which the second target cell belongs transmits a route handover request message to the core network; it should be noted that step 9 and step 7 have no priority order. After receiving the RRC reconfiguration complete message transmitted by the UE, the network device to which the second target cell belongs transmits the third indication information to the core network for requesting the core network to perform a route handover.

Step 10: a response message corresponding to step 9, i.e., a route handover request acknowledge message transmitted by the core network is received.

Step 11: the network device to which the second target cell belongs instructs the source network device to release the UE context.

The example 1 is a handover procedure of the terminal handing over from a direct connection to an indirect connection, in which the terminal obtains the first indication information from the candidate relay and reports the first indication information to the source network device to which the source cell belongs. The first indication information may assist the source network device in determining a first target cell and/or a first target relay to which the terminal is to hand over, so that the source network device performs a handover decision, and it may be ensured that the handover between a direct connection and an indirect connection of the terminal can be successfully completed.

Example 2: a handover procedure of the connection between the terminal and the network from an indirect connection to an indirect connection.

Figure 6:
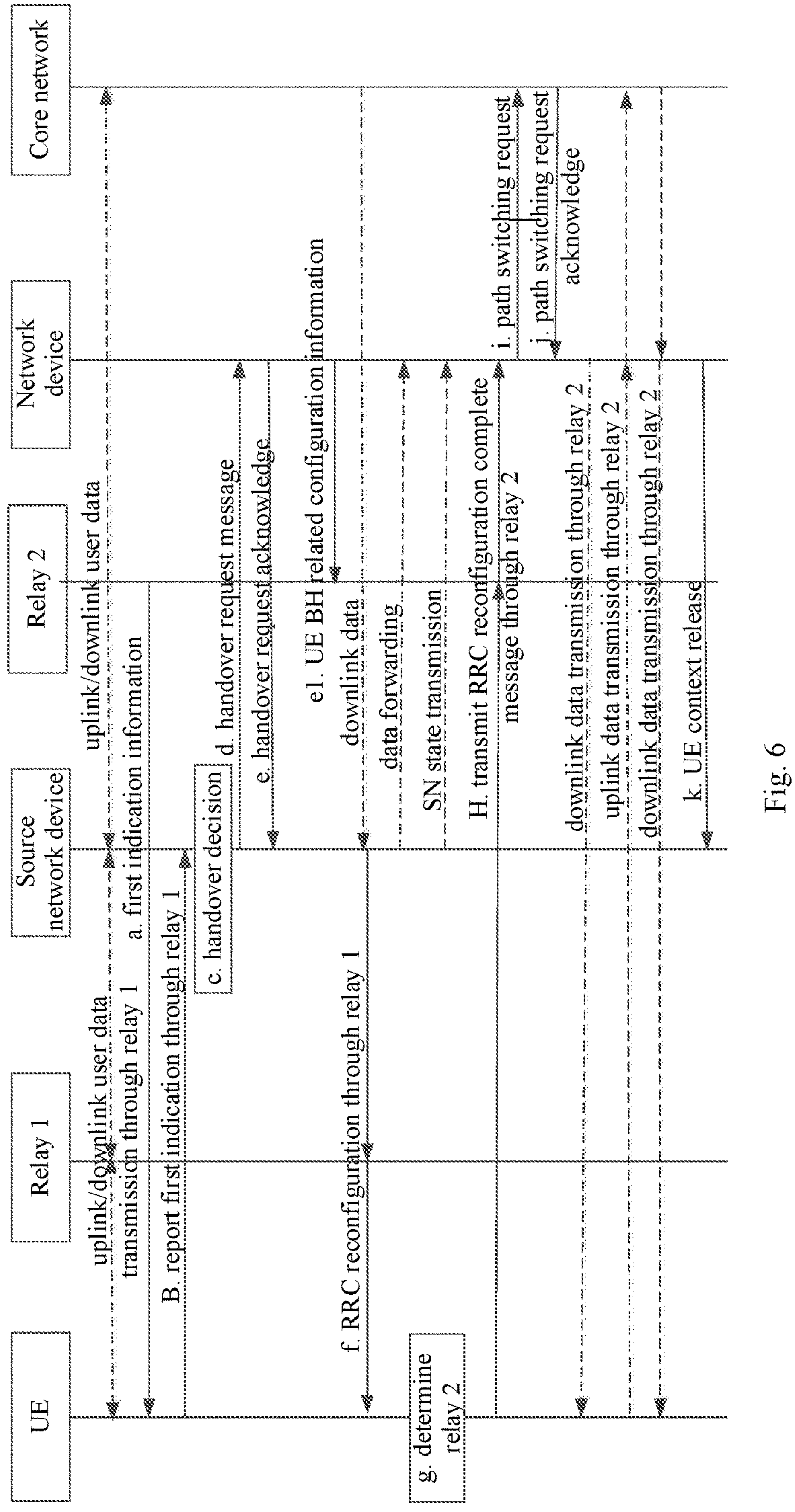
FIG. 6 is a third flowchart of an embodiment of the present disclosure.

As shown in FIG. 6, uplink/downlink user data interactions are performed between the UE and the current service source relay, between the source relay and the source network device to which the source cell belongs, and between the source network device and the core network.

Step a: the UE obtains the first indication information from the candidate relay (relay2). The method for obtaining the first indication information from the relay2 by the UE may include, but is not limited to, one of the following:

method 1: obtaining the first indication information through a relay discovery related message broadcast by relay2 on a sidelink interface;

method 2: obtaining the first indication information through a sidelink interface radio resource control PC5-RRC message, wherein the terminal establishes a sidelink interface unicast connection with relay2;

method 3: combining the method 1 with the method 2, wherein a part of information is provided using the method 1, and a remaining part of the information is provided using the method 2.

The first indication information includes, but is not limited to, at least one of following:

Public Land Mobile Network (PLMN) identification information corresponding to the candidate cell to which the candidate relay belongs;

cell identification information corresponding to the candidate cell to which the candidate relay belongs;

access mode indication information of accessing the candidate cell by the terminal;

association relation indication information between the candidate relay and the candidate cell;

association relation indication information between a candidate relay link and the candidate cell;

a channel quality measurement result of the Uu interface of the candidate relay;

a channel quality measurement result of a sidelink interface between a candidate relay and the terminal;

identification information of the candidate relay;

identification information of the candidate relay link;

moving speed indication information of the candidate relay;

electricity quantity indication information of the candidate relay;

indication information of a service that the candidate relay may serve.

The number of the candidate relays may be one or more, and when there are multiple candidate relays, the serving cells corresponding to different candidate relays may be the same or different.

Step b: the UE reports the first indication information to the source network device to which the source cell belongs through the source relay (relay 1). The UE obtains the first indication information from the relay2, and reports the first indication information to the source cell through the relay 1.

Step c: handover decision is performed; after the source network device of the UE obtains the first indication information from the UE, the source network device performs the handover decision, and determines a first target cell and/or a first target relay.

Step d: a handover request message; the handover request message transmitted by the source network device to the network device to which the first target cell belongs through the inter-base station interface may include, but is not limited to, one or a combination of the following indication information: identification information of the UE that will perform the handover; relay identification information or the identification information of a relay link used by the UE to access the network device to which the first target cell belongs.

Step e: a handover request acknowledge; the handover request acknowledge message transmitted by the network device to which the first target cell belongs through the inter-base station interface to the source network device may include, but is not limited to, one or a combination of the following indication information: identification information of the UE that is to perform handover; relay identification information or the identification information of a relay link used by the UE to access the network device to which the first target cell belongs.

In addition, the network device to which the first target cell belongs may further perform step el, that is, the network device to which the first target cell belongs notifies the relay of the mapping relationship between the sidelink interface RLC channel and the Uu BH channel of the UE.

The source network device determines a unique second target cell and/or a unique second target relay for the terminal according to the received handover request acknowledge message.

Step f: the source network device transmits an RRC reconfiguration message to the UE through the relay 1; in addition to the existing configuration, the RRC reconfiguration message may also carry the following:

identification information of the second target relay (i.e., relay2);

identification information of the second target relay link;

mapping relationship between a sidelink interface radio link control (RLC) channel between the terminal and the second target relay and a second target relay Uu interface RLC channel.

Step g: the UE determines a second target relay (i.e., relay2) to be accessed.

Step h: the UE transmits an RRC reconfiguration complete message to the network device to which the second target cell belongs via the relay2.

Step i: the network device to which the second target cell belongs transmits a route handover request message to the core network; it should be noted that step i and step g have no priority order. After receiving the RRC reconfiguration complete message transmitted by the UE, the network device to which the second target cell belongs transmits the third indication information to the core network for requesting the core network to perform a route handover.

Step j: a response message corresponding to step i, i.e., a route handover request acknowledge message transmitted by the core network is received.

Step k: the network device to which the second target cell belongs instructs the source network device to release the UE context.

The example 2 is a handover procedure of the terminal handing over from an indirect connection to an indirect connection, in which the terminal obtains the first indication information from the candidate relay and reports the first indication information to the source network device to which the source cell belongs. The first indication information may assist the source network device in determining a first target cell and/or a first target relay to which the terminal is to hand over, so that the source network device performs a handover decision, and it may be ensured that the handover between an indirect connection and an indirect connection of the terminal can be successfully completed.

It should be noted that the source network devices in FIG. 5 and FIG. 6 are the network devices to which the source cell currently connected to the terminal belongs, and the network devices in FIG. 5 and FIG. 6 are the network devices to which the target cell to which the terminal hands over belongs. Since the second target cell belongs to the first target cell, both the network device to which the first target cell belongs and the network device to which the second target cell belongs may be exemplified by the network devices in FIG. 5 and FIG. 6.

In the embodiments of the present disclosure, the terminal obtains the first indication information from a candidate relay, and reports the first indication information to the source network device to which the source cell belongs. The first indication information may assist the source network device in determining a first target cell and/or a first target relay to which the terminal is to hand over, so as to enable the source network device to perform a handover decision. The handover method by the terminal provided in the present application may ensure service continuity when the terminal performs the handover from a direct connection to an indirect connection or performs the handover from the indirect connection to the indirect connection.

Figure 7:
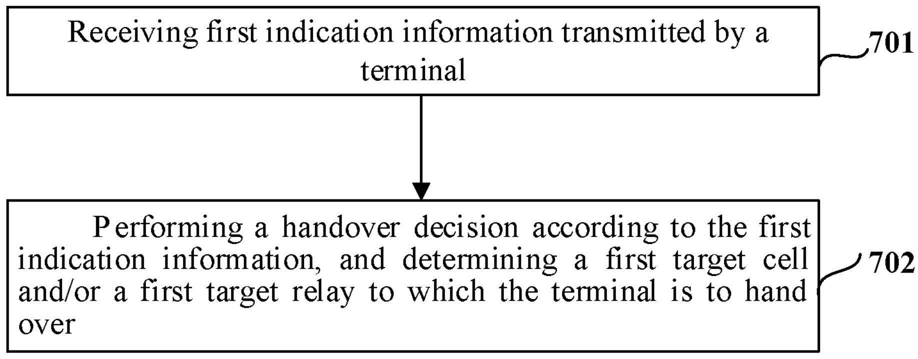
FIG. 7 is a fourth flowchart of an embodiment of the present disclosure.

As shown in FIG. 7, an embodiment of the present disclosure also provides a handover method. The handover method is applied to a network device, where the network device is a source network device to which a source cell belongs. The method includes steps 701-702.

Step 701: receiving first indication information transmitted by a terminal.

The first indication information is obtained by a candidate relay of the terminal, and the candidate relay is a candidate relay when the terminal needs to hand over from the current network connection mode to the indirect connection, wherein, the number of the candidate relays may be one or more; when the candidate relay is one candidate relay, the candidate relay corresponds to one serving cell, or when the number of the candidate relays is plural, different candidate relays may correspond to different serving cells or the same serving cell.

Step 702: performing a handover decision according to the first indication information, and determining a first target cell and/or a first target relay to which the terminal is to hand over.

The source network device determines, according to the first indication information, a first target cell and/or a first target relay to which the terminal is to hand over. The first indication information may include information about the first target cell and/or the first target relay to which the terminal is to hand over.

Specifically, the first indication information may include at least one of following:

Public Land Mobile Network (PLMN) identification information corresponding to the candidate cell to which the candidate relay belongs;

cell identification information corresponding to the candidate cell to which the candidate relay belongs;

access mode indication information of accessing the candidate cell by the terminal;

association relation indication information between the candidate relay and the candidate cell;

association relation indication information between a candidate relay link and the candidate cell;

a channel quality measurement result of the Uu interface of the candidate relay;

a channel quality measurement result of a sidelink interface between a candidate relay and the terminal;

identification information of the candidate relay;

identification information of the candidate relay link;

moving speed indication information of the candidate relay;

electricity quantity indication information of the candidate relay;

indication information of a service that the candidate relay may serve, for example, group information, quality of service (Quality of Service, QoS) of the service, or a service type.

The first indication information includes, but is not limited to, one or a combination of the above, and according to the content of the first indication information, the source network device can uniquely determine the second target relay or the second target cell to which the terminal is to hand over. The second target relay or the second target cell is subordinate to the first target relay or the first target cell.

The number of candidate relays may be N, and N is an integer greater than or equal to 1. The number of the candidate relays may be one or more, and when N is greater than or equal to 2, candidate cells corresponding to at least two candidate relays are the same or different.

Optionally, the method further includes: transmitting a handover request message to a network device to which the first target cell belongs; receiving a handover request acknowledge message, wherein the handover request message and/or the handover request acknowledge message include at least one of following: identification information of the terminal; identification information of the first target relay and identification information of a first target relay link.

Optionally, the method further includes receiving second indication information transmitted by the terminal, wherein the second indication information includes at least one of following:

a channel quality measurement result of a sidelink interface between the terminal and the source relay;

moving speed indication information of the source relay;

electricity quantity indication information of the source relay.

If the embodiment is applied to an indirect-to-indirect handover between a terminal and a network, the terminal may also report the second indication information when reporting the first indication information to a source network device. The second indication information may be carried by the first indication information, or may be transmitted separately by the terminal. The second indication information includes information related to the current service relay of the terminal.

Optionally, the method further includes: transmitting an RRC reconfiguration message to the terminal through a Uu interface or a source relay. The RRC reconfiguration message may include at least one of following:

identification information of the second target relay;

identification information of the second target relay link;

mapping relationship between a sidelink interface radio link control (RLC) channel between the terminal and the second target relay and a second target relay Uu interface RLC channel.

The source network device transmits an RRC reconfiguration message to a terminal, and the terminal can determine, according to the RRC reconfiguration message, a second target cell and/or a second target relay to which the terminal is to hand over. After the terminal determines the second target cell and/or the second target relay, if the second target cell corresponds to a direct connection, the terminal may directly transmit an RRC reconfiguration complete message to a network device to which the second target cell belongs; if the second target cell corresponds to an indirect connection, the terminal may transmit, through the second target relay, an RRC reconfiguration complete message to the network device to which the second target cell belongs.

Optionally, receiving the first indication information transmitted by the terminal includes: receiving, through a Uu interface, the first indication information transmitted by the terminal, or receiving, through a source relay, the first indication information transmitted by the terminal.

When the connection between the terminal and the network is handed over from a direct connection to an indirect connection, the terminal may report the first indication information through the Uu interface, and when the connection between the terminal and the network is handed over from an indirect connection to an indirect connection, the terminal may report the first indication information through the source relay currently in service. After receiving the first indication information, the source network device performs a handover decision according to the content of the first indication information, and determines a first target cell and/or a first target relay to which the terminal is to hand over, In the embodiments of the present disclosure, a terminal obtains first indication information from a candidate relay, and the source network device performs a handover decision according to the first indication information and determines a first target cell and/or a first target relay to which the terminal is to hand over. The present application provides a method for a terminal to perform handover, which can ensure the service continuity when the terminal performs a handover from a direct connection to an indirect connection or from an indirect connection to an indirect connection.

Figure 8:
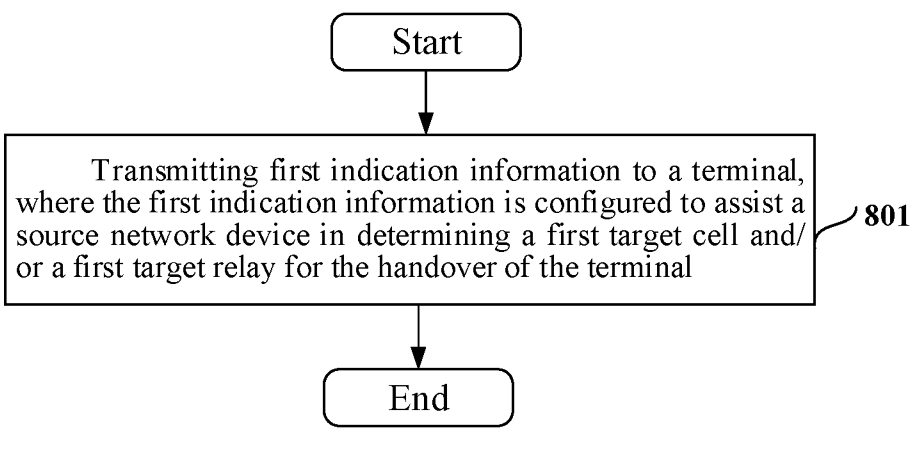
FIG. 8 is a fifth flowchart of an embodiment of the present disclosure.

As shown in FIG. 8, the embodiment of the present disclosure also provides a handover method, which is applied to a relay, wherein the relay is a candidate relay for handover of a terminal, the method includes a step 801.

Step 801: transmitting first indication information to a terminal, where the first indication information is configured to assist a source network device in determining a first target cell and/or a first target relay for the handover of the terminal.

The candidate relay is a candidate relay when the terminal needs to hand over from the current network connection mode to an indirect connection, and the current network connection mode of the terminal may be a direct connection or an indirect connection. When the current network connection mode is handed over to an indirect connection, the terminal needs to establish a connection with the network through the candidate relay.

The number of the candidate relays may be one or more, and when the number of the candidate relays is one, the candidate relay corresponds to one serving cell, and when the number of the candidate relays are plural, different candidate relays may correspond to different serving cells or the same serving cell. The first indication information is obtained by the terminal from the candidate relay.

The first indication information is configured to assist the source network device in determining a first target cell and/or a first target relay for handover of the terminal, and the terminal obtains the first indication information, transmits the first indication information to a source network device, so that the source network device performs a handover decision according to the first indication information.

Specifically, the first indication information may include at least one of following:

Public Land Mobile Network (PLMN) identification information corresponding to the candidate cell to which the candidate relay belongs;

- cell identification information corresponding to the candidate cell to which the candidate relay belongs;
- access mode indication information of accessing the candidate cell by the terminal;
- association relation indication information between the candidate relay and the candidate cell;
- association relation indication information between a candidate relay link and the candidate cell;
- a channel quality measurement result of the Uu interface of the candidate relay;
- a channel quality measurement result of a sidelink interface between a candidate relay and the terminal;
- identification information of the candidate relay;
- identification information of the candidate relay link;
- moving speed indication information of the candidate relay;
- electricity quantity indication information of the candidate relay;
- indication information of a service that the candidate relay may serve, for example, group information, quality of service (Quality of Service, QoS) of the service, or a service type.

The first indication information includes, but is not limited to, one or a combination of the above, and according to the content of the first indication information, the source network device can uniquely determine the second target relay or the second target cell to which the terminal is to hand over. The second target relay or the second target cell belongs to the first target relay or the first target cell.

Optionally, transmitting the first indication information to the terminal includes at least one of following:

- broadcasting a relay discovery related message in a sidelink interface, wherein the relay discovery related message carries the first indication information, wherein the relay discovery related message varies with a discovery mode of the sidelink interface, for example, may be an announcement message of a relay discovery;
- transmitting the first indication information through a sidelink interface radio resource control PC5-RRC message, wherein the terminal establishes a sidelink interface unicast connection with the candidate relay.

In this embodiment, when the candidate relay transmits the first indication information to the terminal, the implementation of the transmitting includes but is not limited to one of the following methods:

- method 1: the candidate relay broadcasts a relay discovery related message on a sidelink interface, such as a PC5 interface, and the first indication information may be carried by the relay discovery related message; the terminal obtains the first indication information by obtaining the relay discovery related message broadcast by the candidate relay;
- method 2: after the terminal performs relay selection, a sidelink interface unicast connection is establish between the terminal and the candidate relay, and then the candidate relay notifies the terminal of the first indication information through the PC5-RRC;
- method 3: a part of information content in the first indication information is obtained using the method 1, and a remaining part of the first indication information is obtained using the method 2.

After receiving the first indication information, the terminal reports the first indication information to a source network device, and the source network device determines, according to the first indication information, a first target cell and/or a first target relay to which the terminal is to hand over, and transmits a handover request message to the network device to which the first target cell belongs.

Optionally, the method further includes: receiving mapping relationship between a sidelink interface radio link control RLC channel between the terminal and the first target relay and a first target relay Uu interface RLC channel. The mapping relationship is transmitted by the target network device to which the target cell belongs.

Optionally, the source network device transmits an RRC reconfiguration message to the terminal after receiving the handover request acknowledge message, and the terminal determines the second target relay according to the RRC reconfiguration message, and transmits an RRC reconfiguration complete message to the network device to which the second target relay belongs through the second target relay, and the network device to which the second target relay belongs transmits a path switching request to the core network.

In the embodiment of the present disclosure, the candidate relay transmits the first indication information to the terminal, and the terminal reports the first indication information to the source network device to which the source cell belongs. The first indication information may assist the source network device in determining a first target cell and/or a first target relay for handover of the terminal, so that the source network device performs the handover decision. The present application provides a method for a terminal to perform handover, which can ensure the service continuity when the terminal performs handover from a direct connection to an indirect connection or from an indirect connection to an indirect connection.

Figure 9:
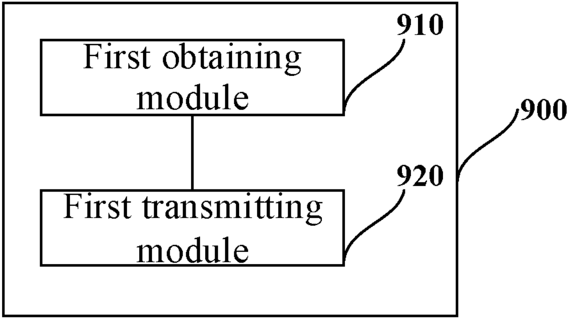
FIG. 9 is a block diagram of a structure of a terminal according to an embodiment of the present disclosure.

As shown in FIG. 9, an embodiment of the present disclosure provides a terminal 900. The terminal 900 includes:

- a first obtaining module 910, configured to obtain first indication information from a candidate relay;
- a first transmitting module 920, configured to transmit the first indication information to a source network device to which a source cell belongs, wherein, the first indication information is configured to assist the source network device in determining a first target cell and/or a first target relay for handover of the terminal.

Optionally, the first indication information may include at least one of following:

- Public Land Mobile Network (PLMN) identification information corresponding to the candidate cell to which the candidate relay belongs;
- cell identification information corresponding to the candidate cell to which the candidate relay belongs;
- access mode indication information of accessing the candidate cell by the terminal;
- association relation indication information between the candidate relay and the candidate cell;
- association relation indication information between a candidate relay link and the candidate cell;
- a channel quality measurement result of the Uu interface of the candidate relay;
- a channel quality measurement result of a sidelink interface between a candidate relay and the terminal;
- identification information of the candidate relay;
- identification information of the candidate relay link;
- moving speed indication information of the candidate relay;
- electricity quantity indication information of the candidate relay;
- indication information of a service that the candidate relay may serve.

Optionally, the number of candidate relays is N, and N is an integer greater than or equal to 1.

Optionally, when N is greater than or equal to 2, candidate cells corresponding to at least two candidate relays are the same or different.

Optionally, the first obtaining module includes at least one of following:

a first obtaining unit configured to obtain the first indication information through a relay discovery related message broadcast by the candidate relay on a sidelink interface;

a second obtaining unit, configured to obtain the first indication information through a sidelink interface Radio Resource Control (PC5-RRC) message, wherein the terminal establishes a sidelink interface unicast connection with the candidate relay.

Optionally, the terminal further includes a third transmitting module, configured to transmit second indication information to a source network device to which the source cell belongs; wherein the second indication information includes at least one of following:

a channel quality measurement result of a sidelink interface between the terminal and the source relay;

moving speed indication information of the source relay;

electricity quantity indication information of the source relay.

Optionally, the terminal further includes:

a second obtaining module, configured to obtain an RRC reconfiguration message;

a second determining module, configured to determine a second target cell and/or a second target relay according to the RRC reconfiguration message; and a fourth transmitting module, configured to transmit an RRC reconfiguration complete message to a network device to which the second target cell belongs, or transmit, through the second target relay, an RRC reconfiguration complete message to a network device to which the second target cell belongs.

Optionally, the RRC reconfiguration message includes at least one of following:

identification information of the second target relay;

identification information of the second target relay link;

mapping relationship between a sidelink interface radio link control (RLC) channel between the terminal and the second target relay and a second target relay Uu interface RLC channel.

Optionally, the first transmitting module is specifically configured to: transmit, through a Uu interface, the first indication information to the source network device to which the source cell belongs, or transmit, through the source relay, the first indication information to the source network device to which the source cell belongs.

It should be noted that the embodiment of the terminal corresponds to the embodiment of the handover method applied to the terminal, and all the implementations in the embodiment of the method are applicable to the embodiment of the terminal. The same technical effect can be achieved. Since the method embodiment and the terminal embodiment are based on the same application concept, and the principles of solving the problem are similar, reference can be made to each other, and the repetition between the method embodiment and the terminal embodiment is not described again.

Figure 10:
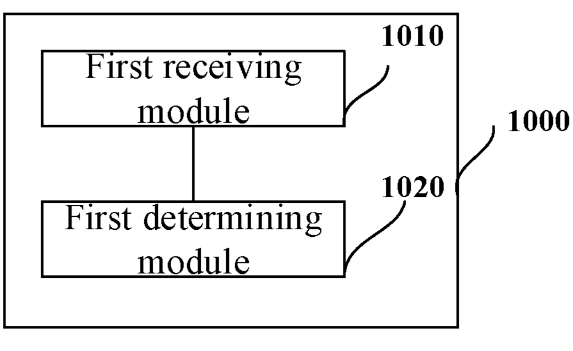
FIG. 10 is a block diagram of a structure of a network device according to an embodiment of the present disclosure.

As shown in FIG. 10, an embodiment of the present disclosure further provides a network device 1000, the network device 1000 is a source network device to which a source cell belongs. The network device includes:

a first receiving module 1010, configured to receive first indication information transmitted by a terminal;

a first determining module 1020, configured to perform a handover decision according to the first indication information, and determine a first target cell and/or a first target relay to which the terminal is to hand over.

Optionally, the network device 1000 further includes:

a fifth transmitting module, configured to transmit a handover request message to a network device to which the first target cell belongs;

a second receiving module, configured receive a handover request acknowledge message, wherein the handover request message and/or the handover request acknowledge message include at least one of following: identification information of the terminal; identification information of the first target relay and identification information of a first target relay link.

Optionally, the first indication information includes at least one of following:

Public Land Mobile Network (PLMN) identification information corresponding to the candidate cell to which the candidate relay belongs;

cell identification information corresponding to the candidate cell to which the candidate relay belongs;

access mode indication information of accessing the candidate cell by the terminal;

association relation indication information between the candidate relay and the candidate cell;

association relation indication information between a candidate relay link and the candidate cell;

a channel quality measurement result of the Uu interface of the candidate relay;

a channel quality measurement result of a sidelink interface between a candidate relay and the terminal;

identification information of the candidate relay;

identification information of the candidate relay link;

moving speed indication information of the candidate relay;

electricity quantity indication information of the candidate relay;

indication information of a service that the candidate relay may serve.

Optionally, the network device further includes a third receiving module, configured to receive second indication information transmitted by the terminal, wherein the second indication information includes at least one of following:

a channel quality measurement result of a sidelink interface between the terminal and the source relay;

moving speed indication information of the source relay;

electricity quantity indication information of the source relay.

Optionally, the network device further includes a sixth transmitting module, configured to transmit an RRC reconfiguration message to the terminal through a Uu interface or a source relay.

Optionally, the RRC reconfiguration message includes at least one of following:

identification information of the second target relay;

identification information of the second target relay link;

mapping relationship between a sidelink interface radio link control (RLC) channel between the terminal and the second target relay and a second target relay Uu interface RLC channel.

Optionally, the first receiving module is specifically configured to: receive, through a Uu interface, the first indication information transmitted by the terminal, or receive, through a source relay, the first indication information transmitted by the terminal.

It should be noted that the embodiment of the network device corresponds to the embodiment of the handover method applied to the network device, and all the implementations in the embodiment of the method are applicable to the embodiment of the network device. The same technical effect can be achieved.

Figure 11:
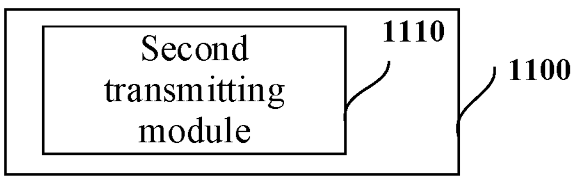
FIG. 11 is a block diagram of a structure of a relay according to an embodiment of the present disclosure.

As shown in FIG. 11, an embodiment of the present disclosure also provides a relay 1100, which is a candidate relay for handover of the terminal. The method includes: a second transmitting module 1110, configured to transmit first indication information to a terminal, where the first indication information is configured to assist a source network device in determining a first target cell and/or a first target relay for the handover of the terminal.

Optionally, the first indication information may include at least one of following:

- Public Land Mobile Network (PLMN) identification information corresponding to the candidate cell to which the candidate relay belongs;
- cell identification information corresponding to the candidate cell to which the candidate relay belongs;
- access mode indication information of accessing the candidate cell by the terminal;
- association relation indication information between the candidate relay and the candidate cell;
- association relation indication information between a candidate relay link and the candidate cell;
- a channel quality measurement result of the Uu interface of the candidate relay;
- a channel quality measurement result of a sidelink interface between a candidate relay and the terminal;
- identification information of the candidate relay;
- identification information of the candidate relay link;
- moving speed indication information of the candidate relay;
- electricity quantity indication information of the candidate relay;
- indication information of a service that the candidate relay may serve.

Optionally, the second transmitting module includes at least one of following:

- a first transmitting unit, configured to broadcast a relay discovery related message in a sidelink interface, wherein the relay discovery related message carries the first indication information;
- a second transmitting unit, configured to transmit the first indication information through a sidelink interface radio resource control PC5-RRC message, wherein the terminal establishes a sidelink interface unicast connection with the candidate relay.

Optionally, the relay further includes a fourth receiving module, configured to receive mapping relationship between a sidelink interface radio link control RLC channel and a first target relay Uu interface RLC channel between the terminal and the first target relay.

It should be noted that the embodiment of the relay corresponds to the embodiment of the handover method applied to the relay, and all the implementations in the embodiment of the method are applicable to the embodiment of the network side device. The same technical effect can be achieved.

It should be noted that the division of the units in the embodiments of the present application is schematic, and is only a logical division of functions, and may be implemented in another division manner. In addition, each functional unit in each embodiment of the present application may be integrated in one processing unit, each unit may exist physically separately, or two or more units may be integrated in one unit. The integrated unit may be implemented in the form of either hardware or software functional units.

The integrated unit, if implemented in the form of a software functional unit and sold or used as a separate product, may be stored in a processor-readable storage medium. Based on this understanding, an essential part, or a part contributing to the related art, or a part or all, of technical solution of the present application may be embodied in the form of a software product. The computer software product is stored in a storage medium and includes instructions for causing a computer device (which may be a personal computer, a server, or a network device or the like) or a processor (processor) to perform all or part of the steps of the method described in various embodiments of the present application. The aforementioned storage media include various media that can store program codes, such as a U disk, a mobile hard disk, a read-only memory (Read-Only Memory), a random access memory (Random Access Memory), a magnetic disk, or an optical disk.

Figure 12:
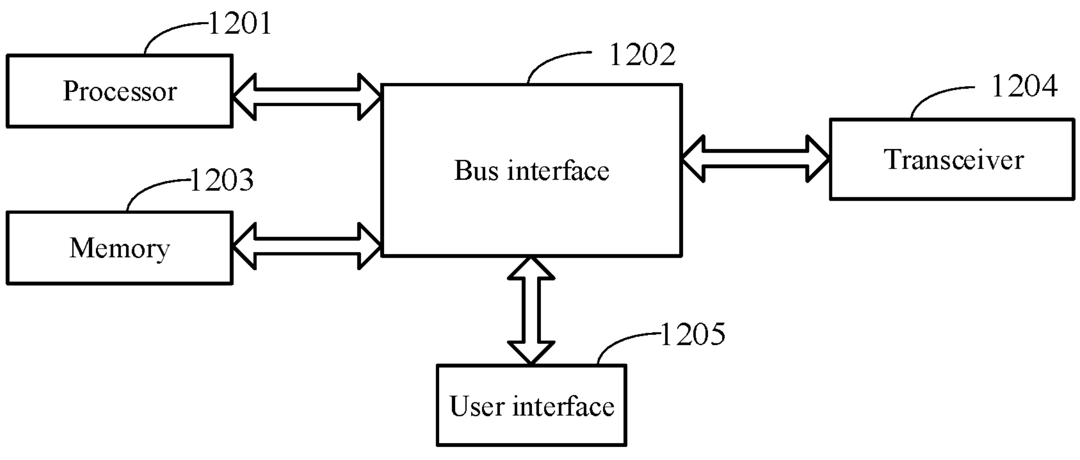
FIG. 12 is a block diagram of a structure of a terminal according to an embodiment of the present disclosure.

As shown in FIG. 12, embodiments of the present disclosure also provide a terminal including a transceiver 1204, a memory 1203, a processor 1201, and a computer program stored on the memory 1203 and executable on the processor.

The memory 1203 is configured for storing a computer program, the transceiver 1204 is connected to a bus interface 1202 for transmitting and receiving data under the control of the processor 1201. The processor 1201 is configured for reading a computer program in the memory 1203 and performing the following operations:

- obtaining first indication information from a candidate relay;
- transmitting the first indication information to a source network device to which a source cell belongs, wherein, the first indication information is configured to assist the source network device in determining a first target cell and/or a first target relay for handover of the terminal;
- Optionally, the first indication information may include at least one of following:
- Public Land Mobile Network (PLMN) identification information corresponding to the candidate cell to which the candidate relay belongs;
- cell identification information corresponding to the candidate cell to which the candidate relay belongs;
- access mode indication information of accessing the candidate cell by the terminal;
- association relation indication information between the candidate relay and the candidate cell;
- association relation indication information between a candidate relay link and the candidate cell;
- a channel quality measurement result of the Uu interface of the candidate relay;
- a channel quality measurement result of a sidelink interface between a candidate relay and the terminal;
- identification information of the candidate relay;
- identification information of the candidate relay link;
- moving speed indication information of the candidate relay;
- electricity quantity indication information of the candidate relay;
- indication information of a service that the candidate relay may serve.

Optionally, the number of candidate relays may be N, and N is an integer greater than or equal to 1.

Optionally, when N is greater than or equal to 2, candidate cells corresponding to at least two candidate relays are the same or different.

Optionally, obtaining the first indication information from the candidate relay includes at least one of following:

obtaining the first indication information through a relay discovery related message broadcast by the candidate relay on a sidelink interface;

obtaining the first indication information through a sidelink interface Radio Resource Control (PC5-RRC) message, wherein the terminal establishes a sidelink interface unicast connection with the candidate relay.

Optionally, when executing the program, the processor is further configured for transmitting second indication information to a source network device to which the source cell belongs; the second indication information includes at least one of following:

a channel quality measurement result of a sidelink interface between the terminal and the source relay;

moving speed indication information of the source relay;

electricity quantity indication information of the source relay.

Optionally, when executing the program, the processor is further configured for:

obtaining an RRC reconfiguration message;

determining a second target cell and/or a second target relay according to the RRC reconfiguration message, and transmitting an RRC reconfiguration complete message to a network device to which the second target cell belongs, or transmitting, through the second target relay, an RRC reconfiguration complete message to a network device to which the second target cell belongs.

Optionally, the RRC reconfiguration message may include at least one of the following:

identification information of the second target relay;

identification information of the second target relay link;

mapping relationship between a sidelink interface radio link control (RLC) channel between the terminal and the second target relay and a second target relay Uu interface RLC channel.

Optionally, transmitting the first indication information to the source network device to which the source cell belongs includes: transmitting, through a Uu interface, the first indication information to the source network device to which the source cell belongs, or transmitting, through the source relay, the first indication information to the source network device to which the source cell belongs.

It should be noted that in FIG. 12, the bus architecture may include any number of interconnected buses and bridges. In particular, various circuits such as one or more processors represented by a processor 1201 and a memory represented by the memory 1203 are linked together. The bus architecture may also link together various other circuits, such as peripheral devices, regulators, and power management circuits, which are well known in the art and, therefore, will not be described further herein. The bus interface provides an interface. The transceiver 1204 may be a number of elements, including a transmitter and a transceiver, for providing a unit for communicating with various other devices over a transmission medium. These transmission media include wireless channels, wired channels, optical cables, and the like. For different terminals, the user interface 1205 may also be an interface capable of externally and internally connecting with a desired device including, but not limited to, a keypad, a display, a speaker, a microphone, a joystick, etc. The processor 1201 is responsible for managing the bus architecture and general processing, and the memory 1203 may store data used by the processor 1201 in performing operations.

Optionally, the processor 1201 may be a CPU (Central Processing Unit), ASIC (Application Specific Integrated Circuit), FPGA (Field Programmable Gate Array) or CPLD (Complex Programmable Logic Device). The processor may also employ a multi-core architecture. The processor executes any of the methods provided in the embodiments of the present application in accordance with the obtained executable instructions by calling the computer program stored in the memory. The processor and the memory may also be physically arranged separately.

It should be noted that the terminal provided in the embodiment of the present disclosure can implement all the steps of the methods implemented in the method embodiment applied to the terminal, and can achieve the same technical effect. Here, the same parts and beneficial effects as those of the method embodiment are not described in detail.

Figure 13:
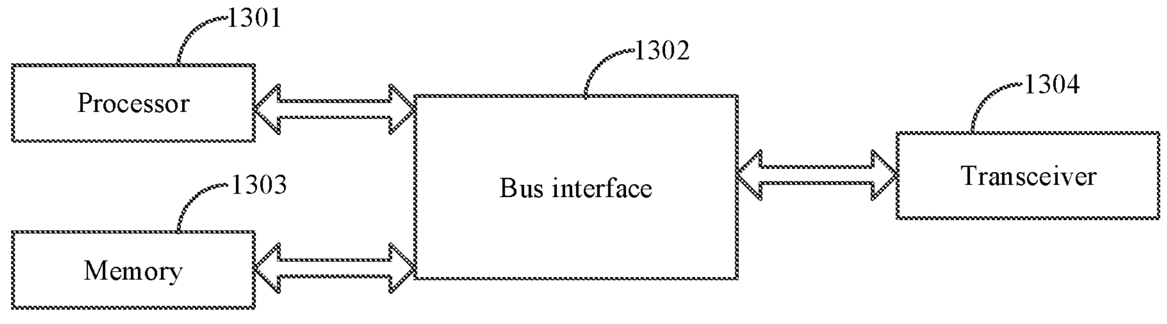
FIG. 13 is a block diagram of a structure of a network device according to an embodiment of the present disclosure.

As shown in FIG. 13, embodiments of the present disclosure also provide a network device including a transceiver 1304, a memory 1303, a processor 1301, and a computer program stored on the memory 1303 and operable on the processor.

The memory 1303 is configured for storing the computer program, the transceiver 1304 is connected to the bus interface 1302 and configured for transmitting and receiving data under the control of the processor 1301. The processor 1301 is configured for reading the computer program in the memory 1303 and performing the following operations:

receiving first indication information transmitted by a terminal;

performing a handover decision according to the first indication information, and determining a first target cell and/or a first target relay to which the terminal is to hand over.

Optionally, when executing the computer program, the processor is further configured for:

transmitting a handover request message to a network device to which the first target cell belongs;

receiving a handover request acknowledge message, wherein the handover request message and/or the handover request acknowledge message include at least one of following: identification information of the terminal; identification information of the first target relay and identification information of a first target relay link.

Optionally, the first indication information includes at least one of following:

Public Land Mobile Network (PLMN) identification information corresponding to the candidate cell to which the candidate relay belongs;

cell identification information corresponding to the candidate cell to which the candidate relay belongs;

access mode indication information of accessing the candidate cell by the terminal;

association relation indication information between the candidate relay and the candidate cell;

association relation indication information between a candidate relay link and the candidate cell;

a channel quality measurement result of the Uu interface of the candidate relay;

a channel quality measurement result of a sidelink interface between a candidate relay and the terminal;

identification information of the candidate relay;

identification information of the candidate relay link;

moving speed indication information of the candidate relay;

electricity quantity indication information of the candidate relay;

indication information of a service that the candidate relay may serve.

Optionally, when executing the computer program, the processor is further configured for receiving second indication information transmitted by the terminal, wherein the second indication information includes at least one of following:

a channel quality measurement result of a sidelink interface between the terminal and the source relay;

moving speed indication information of the source relay;

electricity quantity indication information of the source relay.

Optionally, when executing the computer program, the processor is further configured for: transmitting an RRC reconfiguration message to the terminal through a Uu interface or a source relay.

Optionally, the RRC reconfiguration message may include at least one of following:

identification information of the second target relay;

identification information of the second target relay link;

mapping relationship between a sidelink interface radio link control (RLC) channel between the terminal and the second target relay and a second target relay Uu interface RLC channel.

Optionally, receiving the first indication information transmitted by the terminal includes: receiving, through a Uu interface, the first indication information transmitted by the terminal, or receiving, through a source relay, the first indication information transmitted by the terminal In FIG. 13, the bus architecture may include any number of interconnected buses and bridges. In particular, various circuits such as one or more processors represented by a processor 1301 and a memory represented by the memory 1303 are linked together. The bus architecture may also link together various other circuits, such as peripheral devices, voltage regulators, and power management circuits, which are well known in the art and, therefore, will not be described further herein. The bus interface provides an interface. The transceiver 1304 may be a number of elements, including a transmitter and a transceiver, for providing a unit for communicating with various other devices over a transmission medium. These transmission media include wireless channels, wired channels, optical cables, and the like. The processor 1201 is responsible for managing the bus architecture and general processing, and the memory 1303 may store data used by the processor 1301 in performing operations.

The processor 1301 may be a central processing unit (CPU), an Application Specific Integrated Circuit (ASIC), a Field Programmable Gate Array (FPGA), or complex programmable logic device (Complex Programmable Logic Device, CPLD), or the processor may also adopt a multi-core architecture.

It should be noted that the network device provided in the embodiment of the present disclosure can implement all the method steps implemented in the method embodiment applied to the network device, and can achieve the same technical effect. Here, the same parts and beneficial effects in the embodiment as those of the method embodiment are not described in detail.

Figure 14:
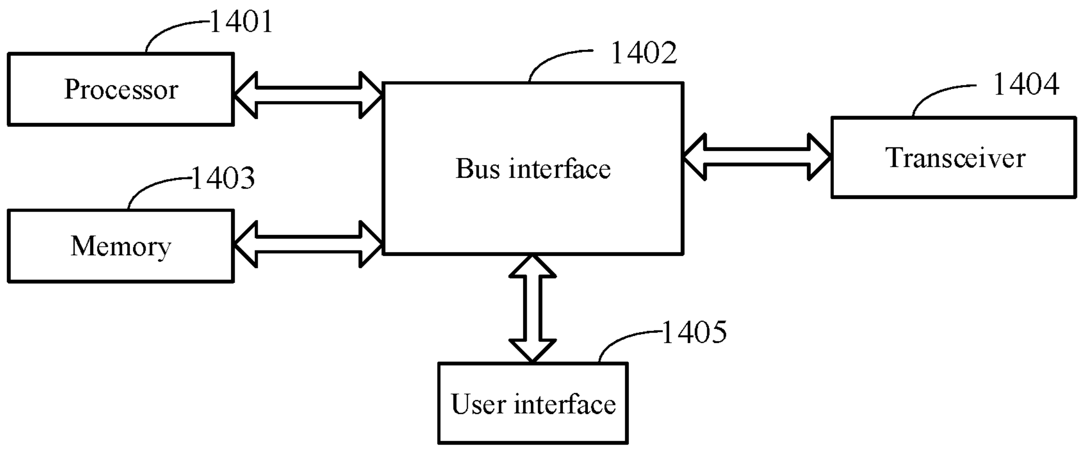
FIG. 14 is a block diagram of a structure of a relay according to an embodiment of the present disclosure.

As shown in FIG. 14, embodiments of the present disclosure also provide a relay, wherein the relay is a candidate relay for handover of the terminal, and the relay may be a network device or a terminal having a relay function. In this embodiment, the relay being a terminal is taken as an example. The relay includes a transceiver 1404, a memory 1403, a processor 1401, and a computer program stored on the memory 1403 and operable on the processor.

The memory 1403 is configured for storing a computer program, the transceiver 1404 is connected to the bus interface 1402 and is configured for transmitting and receiving data under the control of the processor 1401; and the processor 1401 is configured for reading the computer program in the memory 1403 and performing the following operations:

transmitting first indication information to a terminal, where the first indication information is configured to assist a source network device in determining a first target cell and/or a first target relay for the handover of the terminal.

Optionally, the first indication information may include at least one of following:

Public Land Mobile Network (PLMN) identification information corresponding to the candidate cell to which the candidate relay belongs;

cell identification information corresponding to the candidate cell to which the candidate relay belongs;

access mode indication information of accessing the candidate cell by the terminal;

association relation indication information between the candidate relay and the candidate cell;

association relation indication information between a candidate relay link and the candidate cell;

a channel quality measurement result of the Uu interface of the candidate relay;

a channel quality measurement result of a sidelink interface between a candidate relay and the terminal;

identification information of the candidate relay;

identification information of the candidate relay link;

moving speed indication information of the candidate relay;

electricity quantity indication information of the candidate relay;

indication information of a service that the candidate relay may serve.

Optionally, transmitting the first indication information to the terminal includes at least one of following:

broadcasting a relay discovery related message in a sidelink interface, wherein the relay discovery related message carries the first indication information;

transmitting the first indication information through a sidelink interface radio resource control PC5-RRC message, wherein the terminal establishes a sidelink interface unicast connection with the candidate relay.

Optionally, when executing the computer program, the processor is further configured for: receiving mapping relationship between a sidelink interface radio link control RLC channel between the terminal and the first target relay and a first target relay Uu interface RLC channel.

It should be noted that in FIG. 14, the bus architecture may include any number of interconnected buses and bridges. In particular, various circuits such as one or more processors represented by a processor 1401 and a memory represented by the memory 1403 are linked together. The bus architecture may also link together various other circuits, such as peripheral devices, voltage regulators, and power management circuits, which are well known in the art and, therefore, will not be described further herein. The bus interface provides an interface. The transceiver 1404 may be a number of elements, including a transmitter and a transceiver, for providing a unit for communicating with various other devices over a transmission medium. These transmission media include wireless channels, wired channels, optical cables, and the like. For different terminals, the user interface 1405 may also be an interface capable of externally and internally connecting with a desired device including, but not limited to, a keypad, a display, a speaker, a microphone, a joystick, etc. The processor 1401 is responsible for managing the bus architecture and general processing, and the memory 1403 may store data used by the processor 1401 in performing operations.

Optionally, the processor 1401 may be a CPU (Central Processing Unit), ASIC (Application Specific Integrated Circuit), FPGA (Field Programmable Gate Array) or CPLD (Complex Programmable Logic Device). The processor may also employ a multi-core architecture.

The processor executes any of the methods provided in the embodiments of the present application in accordance with the obtained executable instructions by calling the computer program stored in the memory. The processor and the memory may also be physically arranged separately.

It should be noted that the relay provided by the embodiment of the present disclosure can realize all the steps of the method implemented by the method embodiment applied to the relay, and can achieve the same technical effect. Here, the same parts and beneficial effects in the embodiment as those of the method embodiment are not described in detail.

In addition, embodiment of the present disclosure also provide a computer-readable storage medium having a computer program stored thereon, wherein when the program is executed by a processor, the processor implements steps in the handover method described above, and the same technical effect can be implemented. In order to avoid repetition, detailed description is not repeated here. The readable storage medium may be any available medium or data storage device accessible by a processor, and includes, but is not limited to, a magnetic memory (such as floppy disk, a hard disk, a magnetic tape, a magneto-optical disk (MO), etc.), an optical memory (such as CD, DVD, BD, HVD, etc.), a semiconductor memory (such as ROM, EPROM, EEPROM, a non-volatile memory (NAND FLASH), a solid state hard disk (SSD)), and the like.

Furthermore, it should be noted that in the apparatus and the method of the present disclosure, components or steps may be disassembled and/or reassembled. These disassembling and/or reassembling should be considered as an equivalent solution of the present disclosure. Additionally, steps of performing the above-described series of processes may naturally be performed in the time sequence of describing the processes, but need not necessarily be performed in a time order only, and some steps may be performed in parallel or independently of each other. It will be apparent to one of ordinary skill in the art that all or any of the steps of the method or the components of the apparatus of the present disclosure may be implemented in any computing device (including processors, storage media, etc.) or any network of computing devices in hardware, firmware, software, or combinations thereof. This can be accomplished by those of ordinary skill in the art using their basic programming skills after having read the description of the present disclosure.

Accordingly, the objects of the present disclosure may also be achieved by executing a program or a group of programs on any computing device. The computing device may be a known general purpose device. Accordingly, the object of the present disclosure may also be achieved by merely providing a program product including program codes for implementing the method or the apparatus. That is, such a program product also constitutes the present disclosure, and a storage medium storing such a program product also constitutes the present disclosure. Obviously, the storage medium may be any known storage medium or any storage medium developed in the future. It should also be noted that in the apparatus and the method of the present disclosure, it is apparent that the components or the steps may be disassembled and/or reassembled. These disassembling and/or reassembling should be considered as an equivalent solution to the present disclosure. Also, the steps of executing the above-described series of processes may naturally be executed in a time sequence of describing the processes, but need not necessarily be executed in the time order. Some of the steps may be performed in parallel or independently of one another.

The above describes the embodiments of the present disclosure. It should be noted that a number of modifications and embellishments may be made by those of ordinary skill in the art without departing from the principles described herein, these modifications and embellishments are also to be considered to be within the protection scope of the present disclosure.

What is claimed is:

1. A handover method, comprising:

obtaining first indication information from a candidate relay by a terminal;

transmitting the first indication information by the terminal to a source network device to which a source cell belongs, wherein, the first indication information is configured for the source network device to determine a first target cell and/or a first target relay to which the terminal hands over;

obtaining a Radio Resource Control (RRC) reconfiguration message by the terminal;

determining a second target cell and/or a second target relay by the terminal according to the RRC reconfiguration message;

transmitting, through the second target relay, an RRC reconfiguration complete message to a network device to which the second target cell belongs, wherein the RRC reconfiguration message comprises at least one of the following:

identification information of the second target relay;

identification information of a second target relay link; or mapping relationship between a sidelink interface Radio Link Control (RLC) channel between the terminal and the second target relay and a second target relay Uu interface RLC channel.

2. The method according to claim 1, wherein the first indication information comprises information about candidate cells and/or candidate relays of the terminal, wherein the first indication information comprises at least one of following:

Public Land Mobile Network (PLMN) identification information corresponding to a candidate cell to which the candidate relay belongs;

cell identification information corresponding to the candidate cell to which the candidate relay belongs;

access mode indication information of accessing the candidate cell by the terminal;

association relation indication information between the candidate relay and the candidate cell;

association relation indication information between a candidate relay link and the candidate cell;

a channel quality measurement result of a Uu interface of the candidate relay;

identification information of the candidate relay;

identification information of the candidate relay link;

moving speed indication information of the candidate relay;

electricity quantity indication information of the candidate relay;

indication information of a service that the candidate relay is capable of serving; or a channel quality measurement result of a sidelink interface between the candidate relay and the terminal.

3. The method according to claim 2, wherein a quantity of candidate relays is N, and N is an integer greater than or equal to 1.

4. The method according to claim 1, wherein obtaining the first indication information from the candidate relay by the terminal comprises at least one of following:

obtaining the first indication information by the terminal through a relay discovery related message broadcast by the candidate relay on a sidelink interface;

obtaining the first indication information by the terminal through a sidelink interface Radio Resource Control (PC5-RRC) message, wherein the terminal establishes a sidelink interface unicast connection with the candidate relay.

5. The method according to claim 1, further comprising:

transmitting second indication information by the terminal to the source network device to which the source cell belongs, wherein the second indication information comprises at least one of following:

a channel quality measurement result of a sidelink interface between the terminal and a source relay;

moving speed indication information of the source relay;

electricity quantity indication information of the source relay.

6. The method according to claim 1, wherein transmitting the first indication information by the terminal to the source network device to which the source cell belongs comprises:

transmitting, by the terminal through a Uu interface, the first indication information to the source network device to which the source cell belongs, or transmitting, by the terminal through the source relay, the first indication information to the source network device to which the source cell belongs.

7. A terminal, comprising a transceiver, a memory, a processor and a computer program stored on the memory and executable on the processor, wherein when the processor executes the computer program, the processor implements the steps of the handover method according to claim 1.

8. A handover method, comprising:

receiving, by a network device, first indication information transmitted by a terminal, wherein the network device is a source network device to which a source cell belongs;

performing a handover decision according to the first indication information by the network device, and determining a first target cell and/or a first target relay to which the terminal is to hand over;

transmitting a Radio Resource Control (RRC) reconfiguration message by the network device to the terminal through a Uu interface or a source relay;

wherein the RRC reconfiguration message comprises at least one of the following:

identification information of a second target relay;

identification information of a second target relay link; or mapping relationship between a sidelink interface Radio Link Control (RLC) channel between the terminal and the second target relay and a second target relay Uu interface RLC channel.

9. The method according to claim 8, further comprising:

transmitting, by the network device, a handover request message to a network device to which the first target cell belongs;

receiving, by the network device, a handover request acknowledge message, wherein the handover request message and/or the handover request acknowledge message comprise at least one of following:

identification information of the terminal;

identification information of the first target relay;

identification information of a first target relay link.

10. The method according to claim 8, wherein the first indication information further comprises:

a channel quality measurement result of a sidelink interface between the candidate relay and the terminal.

11. The method according to claim 8, further comprising:

receiving, by the network device, second indication information transmitted by the terminal, wherein the second indication information comprises at least one of following:

a channel quality measurement result of a sidelink interface between the terminal and a source relay;

moving speed indication information of the source relay;

power quantity indication information of the source relay.

12. The method according to claim 8, wherein the first indication information comprises information about candidate cells and/or candidate relays of the terminal;

wherein the first indication information comprises at least one of following:

Public Land Mobile Network (PLMN) identification information corresponding to a candidate cell to which the candidate relay belongs;

cell identification information corresponding to the candidate cell to which the candidate relay belongs;

access mode indication information of accessing the candidate cell by the terminal;

association relation indication information between the candidate relay and the candidate cell;

association relation indication information between a candidate relay link and the candidate cell;

a channel quality measurement result of a Uu interface of the candidate relay;

identification information of the candidate relay;

identification information of the candidate relay link;

moving speed indication information of the candidate relay;

electricity quantity indication information of the candidate relay;

indication information of a service that the candidate relay is capable of serving; or a channel quality measurement result of a sidelink interface between the candidate relay and the terminal.

13. The method according to claim 8, wherein receiving, by the network device, the first indication information transmitted by the terminal comprises:

receiving, by the network device, through a Uu interface, the first indication information transmitted by the terminal, or receiving, through a source relay, the first indication information transmitted by the terminal.

14. A network device, the network device being a source network device to which a source cell belongs, the network device comprising a transceiver, a memory, a processor and a computer program stored on the memory and executable on the processor, wherein, when the processor executes the computer program, the processor implements the steps of the handover method according to claim 10.

15. A handover method, comprising:

transmitting first indication information by a relay to a terminal, wherein the relay is a candidate relay for handover of the terminal, wherein, the first indication information is configured for a source network device to determine a first target cell and/or a first target relay to which the terminal hands over, so that the source network device transmits a Radio Resource Control (RRC) reconfiguration message to the terminal through a Uu interface or a source relay, and the RRC reconfiguration message is used by the terminal to determine a second target cell and/or a second target relay according to the RRC reconfiguration message, wherein the RRC reconfiguration message comprises at least one of the following:

identification information of the second target relay;

identification information of a second target relay link; or mapping relationship between a sidelink interface Radio Link Control (RLC) channel between the terminal and the second target relay and a second target relay Uu interface RLC channel.

16. The method according to claim 15, wherein transmitting the first indication information by the relay to the terminal comprises at least one of following:

broadcasting a relay discovery related message in a sidelink interface by the relay, wherein the relay discovery related message carries the first indication information;

transmitting the first indication information by the relay through a sidelink interface Radio Resource Control (PC5-RRC) message, wherein the terminal establishes a sidelink interface unicast connection with the candidate relay.

17. The method according to claim 15, further comprising:

receiving, by the relay, mapping relationship between a sidelink interface Radio Link Control (RLC) channel between the terminal and the first target relay and a first target relay Uu interface RLC channel.

18. A relay, the relay being a candidate relay for handover of a terminal, the relay comprising a transceiver, a memory, a processor and a computer program stored on the memory and executable on the processor, wherein, when the processor executes the computer program, the processor implements the steps of the handover method according to claim 15.

19. The handover method according to claim 15, wherein, the first indication information comprises information about candidate cells and/or candidate relays of the terminal, wherein the first indication information comprises at least one of following:

access mode indication information of accessing the candidate cell by the terminal;

association relation indication information between the candidate relay and the candidate cell;

association relation indication information between a candidate relay link and the candidate cell;

a channel quality measurement result of a Uu interface of the candidate relay;

identification information of the candidate relay;

identification information of the candidate relay link;

moving speed indication information of the candidate relay;

electricity quantity indication information of the candidate relay;

indication information of a service that the candidate relay is capable of serving; or a channel quality measurement result of a sidelink interface between the candidate relay and the terminal.

* * * * *